(12) United States Patent
Rebstock

(10) Patent No.: US 6,517,756 B1
(45) Date of Patent: Feb. 11, 2003

(54) METHOD FOR MANUFACTURING BODIES CONTAINING REINFORCING FIBERS

(75) Inventor: Kolja Rebstock, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/365,818

(22) Filed: Aug. 2, 1999

(30) Foreign Application Priority Data

Jul. 31, 1998 (DE) ................................. 198 34 542

(51) Int. Cl.⁷ .......................... B29C 43/02; F16D 69/02
(52) U.S. Cl. .................... 264/108; 264/29.1; 264/319
(58) Field of Search .................... 264/29.1, 108, 264/257, 258, 29.6, 319, 320

(56) References Cited

U.S. PATENT DOCUMENTS

| | | | | |
|---|---|---|---|---|
| 4,786,347 A | * | 11/1988 | Angus | 264/108 |
| 5,091,125 A | * | 2/1992 | Harada et al. | 264/108 |
| 6,042,935 A | * | 3/2000 | Krenkel et al. | |
| 6,062,351 A | * | 5/2000 | Strasser et al. | 264/257 |
| 6,086,814 A | * | 7/2000 | Krenkel et al. | 264/29.1 |

FOREIGN PATENT DOCUMENTS

| | | |
|---|---|---|
| DE | 44 38 455 C1 | 5/1996 |
| DE | 4438455 | 5/1996 |
| DE | 44 38 456 | 5/1996 |
| DE | 197 11 829 C1 | 9/1998 |
| DE | 19711829 | 9/1998 |
| DE | 197 11 831 | 9/1998 |
| WO | WO 98/08779 | 3/1998 |

OTHER PUBLICATIONS

A. M. Wittfoht, et al., "Plastics Technical Dictionary, Part 3: Reference Volume Illustrated Systematic Groups" Hanser International, 1978.
Römpp Chemical Dictionary, 9$^{th}$ Edition, page 1310 "Fiber Reinforcement"; page 1427 "molding Compounds"; page 3611 "Compression" with Statement of Relevancy.
"Industrial Ceramic Materials", Jochen Kriegesmann; German Ceramics Society, Deutscher Wirtschaftsdienst (Mar. 1993), chapter 4.4.1.0, (14$^{th}$ revised and enlarged edition), pp. 17 to 22 and pp. 32 to 35 with Statement of Relevancy.
Jin Ko, et al., "Prediction of Fiber Orientation in the Thickness Plane During Flow Molding of Short Fiber Composites" Polymer Composites, vol. 16, No. 2, Apr. 1995.
T. D. Papathanasiuo, et al., "Flow Induced Alignment in Composite Materials" Woodhead Publishing Ltd., 1997.

* cited by examiner

*Primary Examiner*—Mathieu D. Vargot
(74) *Attorney, Agent, or Firm*—Crowell & Moring LLP

(57) ABSTRACT

A method for manufacturing bodies containing reinforcing fibers includes mixing fibers, fiber bundles, or fiber agglomerates with at least one binder that can be carbonized to form a molding material; and compressing the molding material to form bodies containing reinforcing fibers with a mold having inserts. The resulting bodies have recesses with lateral edges corresponding to the inserts such that the reinforcing fibers are oriented approximately parallel to the lateral edges of the recesses.

10 Claims, 5 Drawing Sheets

METHOD FOR MANUFACTURING BODIES CONTAINING REINFORCING FIBERS

BACKGROUND AND SUMMARY OF THE INVENTION

This application claims the priority of German Patent Application No. 198 34 542.9, filed Jul. 31, 1998, the disclosure of which is expressly incorporated by reference herein.

The present invention relates to a method for manufacturing bodies containing reinforcing fibers. Fibers, fiber bundles, or fiber agglomerates containing at least one binder that can be carbonized, and possibly additional fillers or additives, are mixed into a molding material. The molding material is then compressed to form a body containing reinforcing fibers using a mold having a cavity closely resembling the final shape.

The method according to the present invention is used in particular for manufacturing carbon-fiber-reinforced (CFR) ceramic composites. For this purpose, fabric or mats made of carbon fibers or fiber bundles, possibly coated with binder, are mixed together with other binders and fillers. The mixture is molded to form a so-called green compact or CFR composite and is then pyrolyzed. The binder or at least one of the binders changes to a porous carbon matrix. The resultant porous carbon or carbon-carbon body is then melt-infiltrated with silicon. The present invention relates to the manufacture of the green compact or CFR composite.

DE 44 38 455 C1 is directed to the manufacture of vented brake disks in which the vent channels are created by joining fiber-reinforced bodies of different geometries. The problem with this method is that fiber fabric or fiber mats are used that are saturated with binder and placed on top of one another. This produces an anisotropic body whose fibers are oriented in two preferential directions corresponding to the fabric layers. This creates problems with joining a plurality of such bodies to form a complex structure, since the connection between the individual elements is not sufficiently stable.

Instead of fiber fabric or fiber mats, unpublished German Patent Application 197 11 829 1 is directed to the use of individual fibers or fiber bundles randomly oriented in all three directions. This in turn produces an anisotropic body with properties that are essentially the same in all three directions in space. The problem remains of joining such bodies so that a stable connection is produced at the joints.

The object of the present invention therefore consists in creating a method to join two bodies with stable connections at the joints.

This object is achieved according to the present invention by compressing the molding material in a mold that has one or more inserts so that the resultant body containing reinforcing fibers has recesses matching these inserts. The reinforcing fibers are oriented along these recesses roughly parallel to the lateral edges of the recesses.

CFR composites, for example green compacts with optimized fiber orientation, are produced by the method according to the present invention. The method is characterized by the fact that the green compacts have recesses and/or projections or nubs corresponding thereto. As a result of its flowability, the molding material in the vicinity of the recesses follows the fiber alignment of the pressing force. When such bodies are joined, a solid connection at the joint results due to the fiber orientation.

The inserts in the mold comprise both (1) projections permanently connected with the interior of the mold or other uneven locations on the interior, and (2) parts placed loosely in the mold, such as bolts or inserts of any shape, for example, parallelipipeds, stars, pins, and the like.

Fibers, fiber bundles, or fiber agglomerates based on carbon, nitrogen, boron or silicon are suitable as reinforcing fibers, for example. Carbon fibers or silicon carbide fibers are particularly well suited. The fibers preferably have a length of 1 to 30 mm. The at least one curable binder that can be carbonized is preferably used in an amount of approximately 5 to 16 weight percent based on the molding material.

By varying the amount of binder and the fiber length, the flowability of the resultant molding material can be adjusted. If necessary, one or more extrusion molding aids can be used as well.

Other objects, advantages and novel features of the present invention will become apparent from the following detailed description of the invention when considered in conjunction with the accompanying drawings.

DETAILED DESCRIPTION OF THE DRAWINGS

Figure 1:
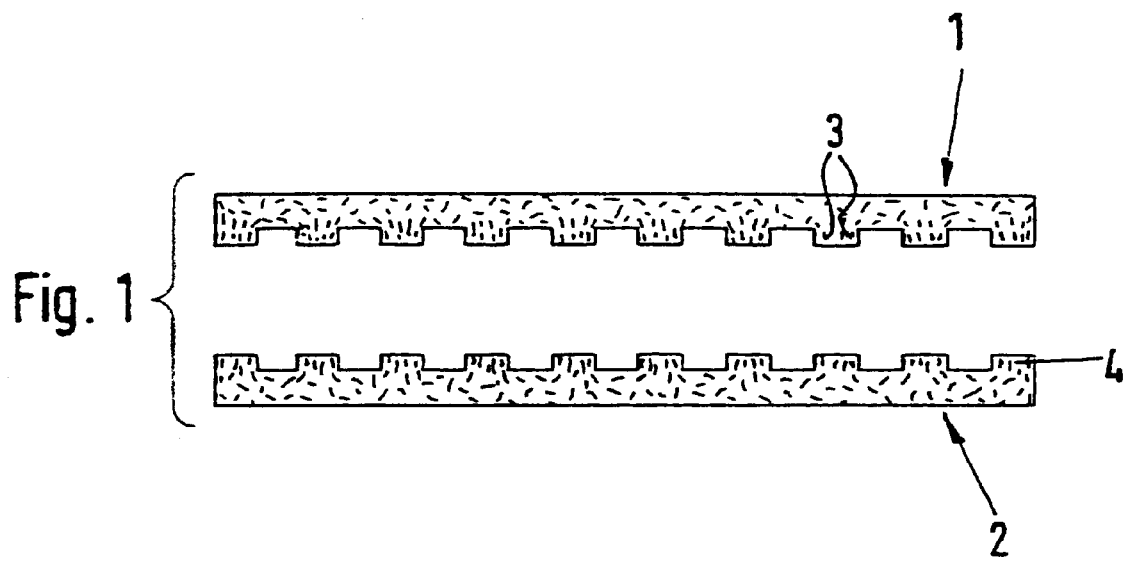
FIG. 1 is a schematic representation of two green compacts manufactured according to the present invention for producing vented brake disks.
Figure 2:
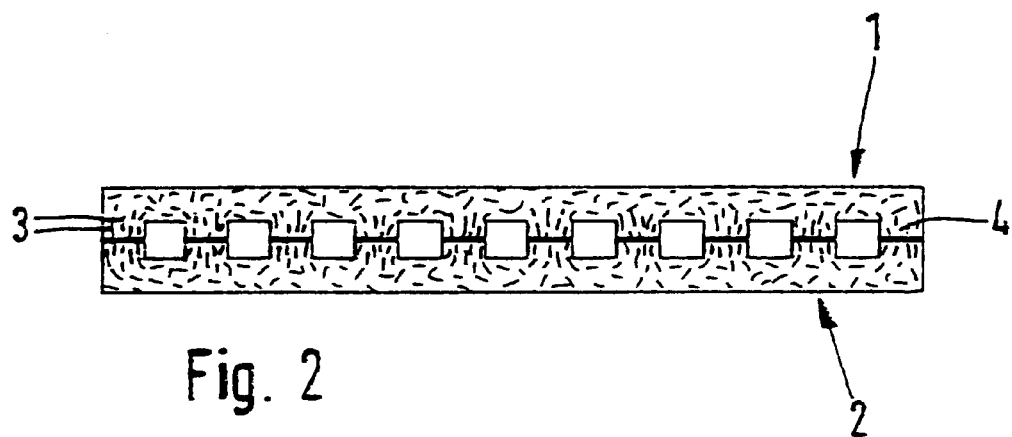
FIG. 2 is a schematic representation of a joined body made of the green compacts shown in FIG. 1.
Figure 3:
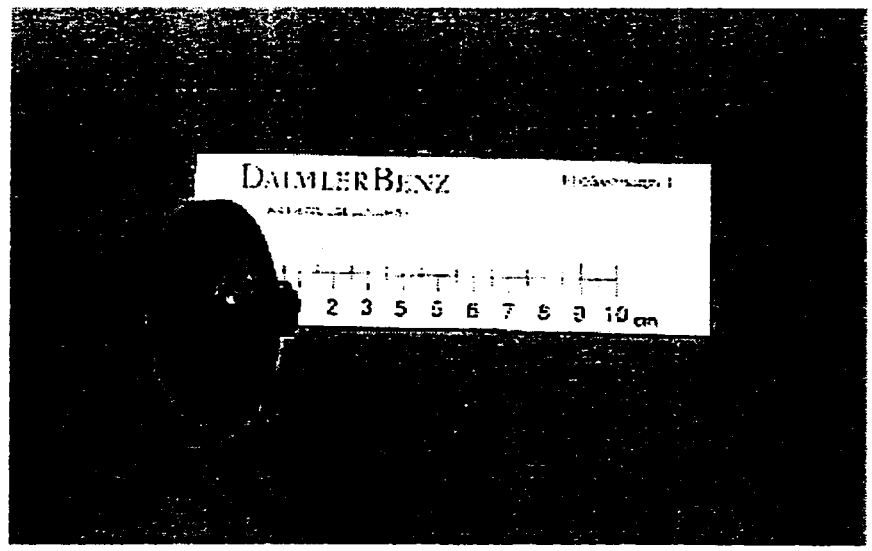
FIG. 3 is a polished section of a joint with a molding material containing fibers 15 to 25 mm long and 40 to 16 wt. % phenolic resin.
Figure 4:
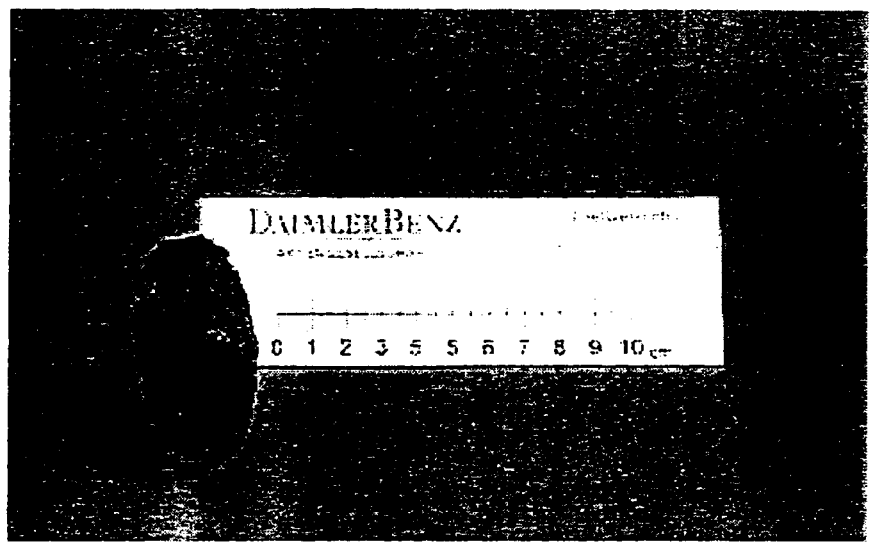
FIG. 4 is a polished section of a joint with a molding material containing fibers 15 to 25 mm long and 5 to 10 wt. % phenolic resin.
Figure 5:
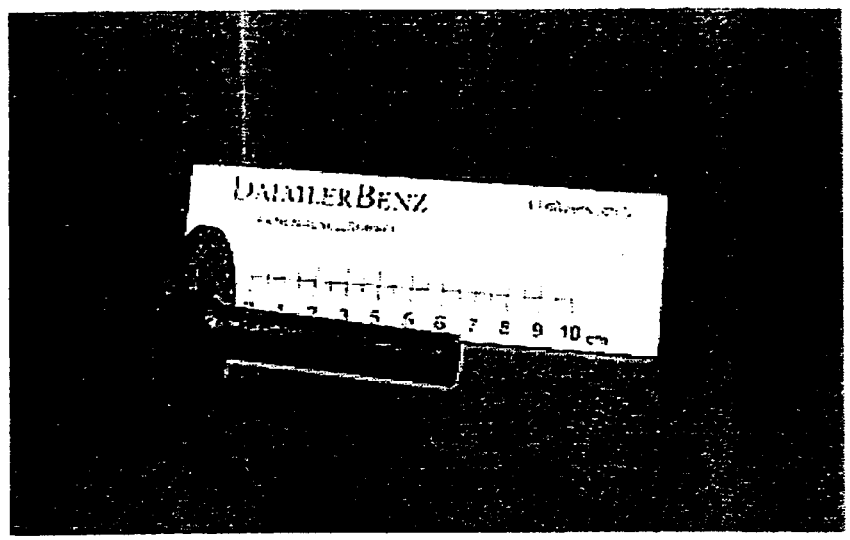
FIG. 5 is a polished section of a joint with a molding material containing fibers 2 to 5 mm long and 40 to 60 wt. % phenolic resin.
Figure 6:
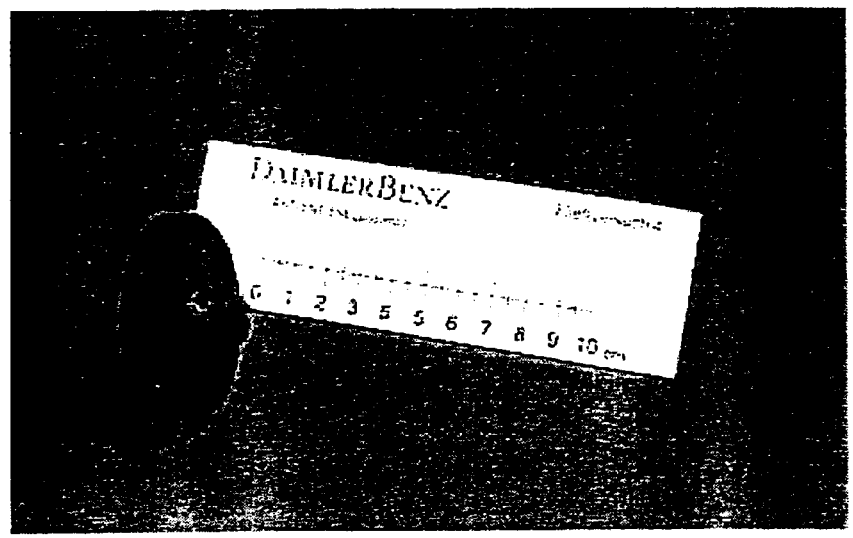
FIG. 6 is a polished section of a joint with a molding material containing fibers 2 to 5 mm long and 5 to 10 wt. % phenolic resin.
Figure 7:
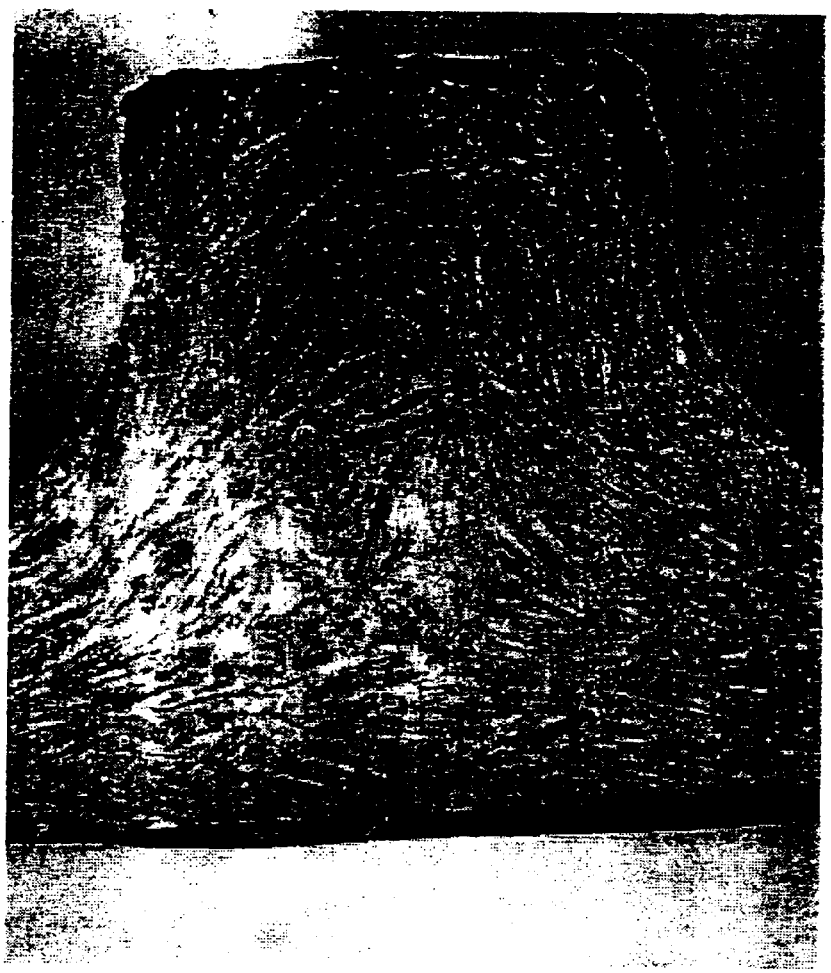
FIGS. 7 and 8 are photographs of the sectioned sample shown in FIG. 6.
Figure 8:
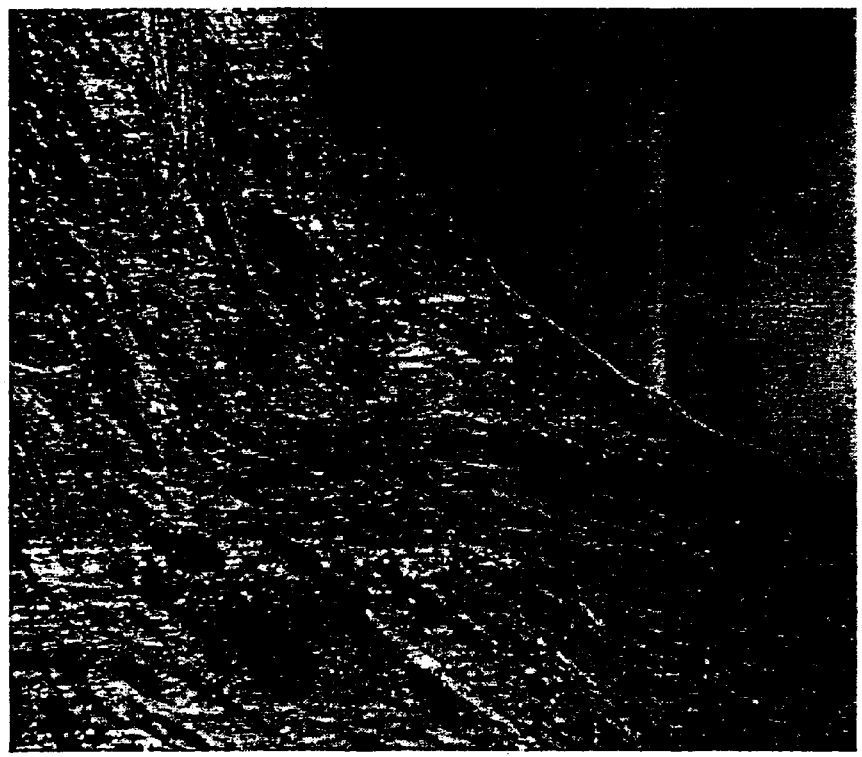

The method according to the present invention is based on the knowledge that in the marginal areas inside the mold, for example, along the projections provided in the mold or along bolts or the like placed in the mold, the fibers of the molding material orient themselves with the molding force acting on them. During the manufacture of nubbed disks, for example, this orientation takes place in the direction of the nubs. For this purpose, molding material is placed in a mold and a perforated sheet is inserted. After compression, nubbed disks 1, 2 shown schematically in FIG. 1 can be removed. The fibers 3 of the molding material exhibit a special orientation along nubs 4, as indicated in FIG. 1. During subsequent joining, it has been found that the vicinity of the joint is nearly gap-free (FIGS. 2 to 8). The joint can be clearly seen. The structure consists of carbon fibers and carbon grains. The silicon components occur as silicon carbide and free silicon.

The molded objects are produced as in the following embodiment. Carbon fiber bundles measuring 15 to 25 mm long and 2 to 5 mm long and of an undefined thickness are impregnated by saturating the fiber bundles in a phenolic resin solution. Saturation is followed by drying and curing the resin at 130° C. in a recirculating drying cabinet. The dried, coated carbon fiber bundles are then conditioned by saturating them with a pitch solution. The fibers thus coated form the basis for producing a molding material that is prepared in a mixer-kneader with the addition of (1) powdered carbon, and (2) 40 to 60 weight percent or 5 to 10 weight percent phenolic resin (e.g., Novolak "BAKELITE 8978 FL"). During kneading, a mixture of titanium carbide and boron carbide in powdered form is added continuously. The material thus prepared was compressed to form a nubbed disk using a mold with a cavity closely resembling the final shape in which the material was cured to form dimensionally stable nubbed disks at a temperature of at least 50° C. This was followed by pyrolysis at approximately 800° C. in a pyrolysis oven under protective gas. The material was then infiltrated with a liquid silicon melt under vacuum at a temperature above the melting point of silicon, approximately 1600° C., and subsequently cooled to room temperature.

As can be seen from the enclosed polished sections (FIGS. 3 to 8), the fiber bundles show a preferred orientation parallel to the lateral edges of the nubs in the vicinity of the nubs. All combinations of a molding material with a high binder component of 40 to 60 weight percent phenolic resin (FIGS. 3 and 5) and a molding material with a low binder component of 5 to 10 weight percent phenolic resin (FIGS. 2 and 4) with fibers 15 to 25 mm long (FIGS. 1 and 2) and fibers 2 to 5 mm long (FIGS. 3 and 4) were compared. The molding pressure was 100 bars both times.

The favorable alignment of the fibers relative to the introduction of force is clearly evident in the figures. The flowability can be definitely improved by varying the direction of the short fiber length and providing a higher binder content.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for manufacturing a nubbed disk of a vented brake disk containing reinforcing fibers, comprising:

mixing fibers, fiber bundles, or fiber agglomerates and at least one binder into a molding material; and compressing the molding material in a mold having inserts to form the nubbed disk of the vented brake disk containing reinforcing fibers and having recesses with lateral edges corresponding to the inserts and with the reinforcing fibers oriented parallel to the lateral edges.

2. A method according to claim 1, further comprising adding additional fillers or additives to the molding material.

3. A method according to claim 1, wherein the fibers, fiber bundles, or fiber agglomerates comprise an element selected from the group consisting of carbon, nitrogen, boron, silicon and combinations thereof.

4. A method according to claim 1, wherein the fibers, fiber bundles, or fiber agglomerates comprise carbon or silicon carbide.

5. A method according to claim 1, wherein the fibers have a fiber length of approximately 1 to 30 mm.

6. A method according to claim 1, wherein the at least one binder is in an amount of approximately 5 to 60 weight percent based on the molding material.

7. A method according to claim 2, wherein the additional additives comprise at least one extrusion molding aid.

8. A method according to claim 1, wherein the inserts are in the form of projections permanently attached to the interior of the mold.

9. A method according to claim 1, wherein the inserts are in the form of loose parts inserted into the mold.

10. A method according to claim 1, wherein the inserts comprise moveable bolts.

* * * * *